United States Patent [19]

O'Brien

[11] Patent Number: 5,525,757

[45] Date of Patent: Jun. 11, 1996

[54] FLAME RETARDANT POLYOLEFIN WIRE INSULATIONS

[75] Inventor: Douglas D. O'Brien, Richmond, Ind.

[73] Assignee: Belden Wire & Cable Co., Richmond, Ind.

[21] Appl. No.: 404,415

[22] Filed: Mar. 15, 1995

[51] Int. Cl.$^6$ ........................ H01B 7/00
[52] U.S. Cl. .............. 174/121 A; 174/110 SR; 174/110 PM; 174/113 R; 174/34
[58] Field of Search ............... 174/110 SR, 110 PM, 174/113 R, 121 A, 34

[56] References Cited

U.S. PATENT DOCUMENTS

| | | | |
|---|---|---|---|
| 3,231,636 | 1/1966 | Snyder | 524/333 |
| 3,243,395 | 3/1966 | Guillet | 524/483 |
| 3,331,797 | 7/1967 | Kopetz et al. | 524/412 |
| 3,355,520 | 11/1967 | Maloney et al. | 525/240 |
| 3,823,255 | 7/1974 | LaGase et al. | 174/121 A |
| 3,900,533 | 8/1975 | Krackeler | 524/111 |
| 4,089,912 | 5/1978 | Levek et al. | 524/112 |
| 4,283,459 | 7/1981 | Urban et al. | 174/110 SR |
| 4,328,139 | 5/1982 | Simons | 174/121 A |
| 4,373,048 | 2/1983 | Schubert et al. | 524/371 |
| 4,426,549 | 1/1984 | Natwig | 174/121 A |
| 4,430,470 | 2/1984 | Taniguchi et al. | 174/110 SR |
| 4,514,466 | 4/1985 | Leon, Jr. et al. | 174/121 A |
| 4,575,184 | 3/1986 | Ueno et al. | 174/110 SR |
| 4,605,818 | 8/1986 | Arroyo et al. | 174/113 R |
| 4,853,154 | 8/1989 | Icenogle et al. | 174/121 A |
| 4,857,673 | 8/1989 | Wilkus et al. | 174/110 PM |
| 4,869,848 | 9/1989 | Hasegawa et al. | 174/113 R |
| 4,969,706 | 11/1990 | Hardin et al. | 174/110 SR |
| 5,010,210 | 4/1991 | Sidi et al. | 174/113 R |
| 5,180,889 | 1/1993 | Rogers et al. | 174/113 R |
| 5,211,746 | 5/1993 | Keogh et al. | 174/110 PM |
| 5,288,785 | 2/1994 | Jow et al. | 174/110 SR |
| 5,358,991 | 10/1994 | O'Brien | 524/399 |
| 5,378,539 | 1/1995 | Chen | 174/113 R |

FOREIGN PATENT DOCUMENTS

| | | | |
|---|---|---|---|
| 0223198 | 12/1957 | Australia | 174/110 PM |
| 0120653 | 9/1979 | Japan | 174/110 SR |
| 0234430 | 9/1993 | Japan | 174/110 PM |
| 0713174 | 8/1954 | United Kingdom | 174/110 PM |

Primary Examiner—Peter A. Szekely
Attorney, Agent, or Firm—Laff, Whitesel, Conte & Saret, Ltd.

[57] ABSTRACT

An insulated conductor and the flame retardant insulation composition used in plenum cables. The insulation composition includes as a polyolefin blend from about 50 to 85 parts by weight of polypropylene, 10 to about 40 parts by weight of a very low density polyethylene and from about 5 to about 20 parts by weight of a high and/or low density polyethylene. To one hundred parts by weight of the polyolefin blend there is about 6 to about 20 parts by weight of a chlorinated flame retardant, from about 4 to about 12 parts by weight of a flame retardant intumescent, from about 20 to 60 parts by weight of a non-halogen flame retardant, from about 0.2 to about 1.0 parts by weight of hindered phenolic stabilizer; and from about 0.1 to about 0.4 parts by weight of additional stabilizers. One of the non-halogen flame retardants in the polyolefin composition, may be zinc borate which triggers polymer and flame retardant decomposition when the polyolefin composition is exposed to an igniting flame. Alternatives to zinc borate include zinc stearate, magnesium stearate, ammonium octamolybdate (AOM), or zinc stannate.

10 Claims, 1 Drawing Sheet

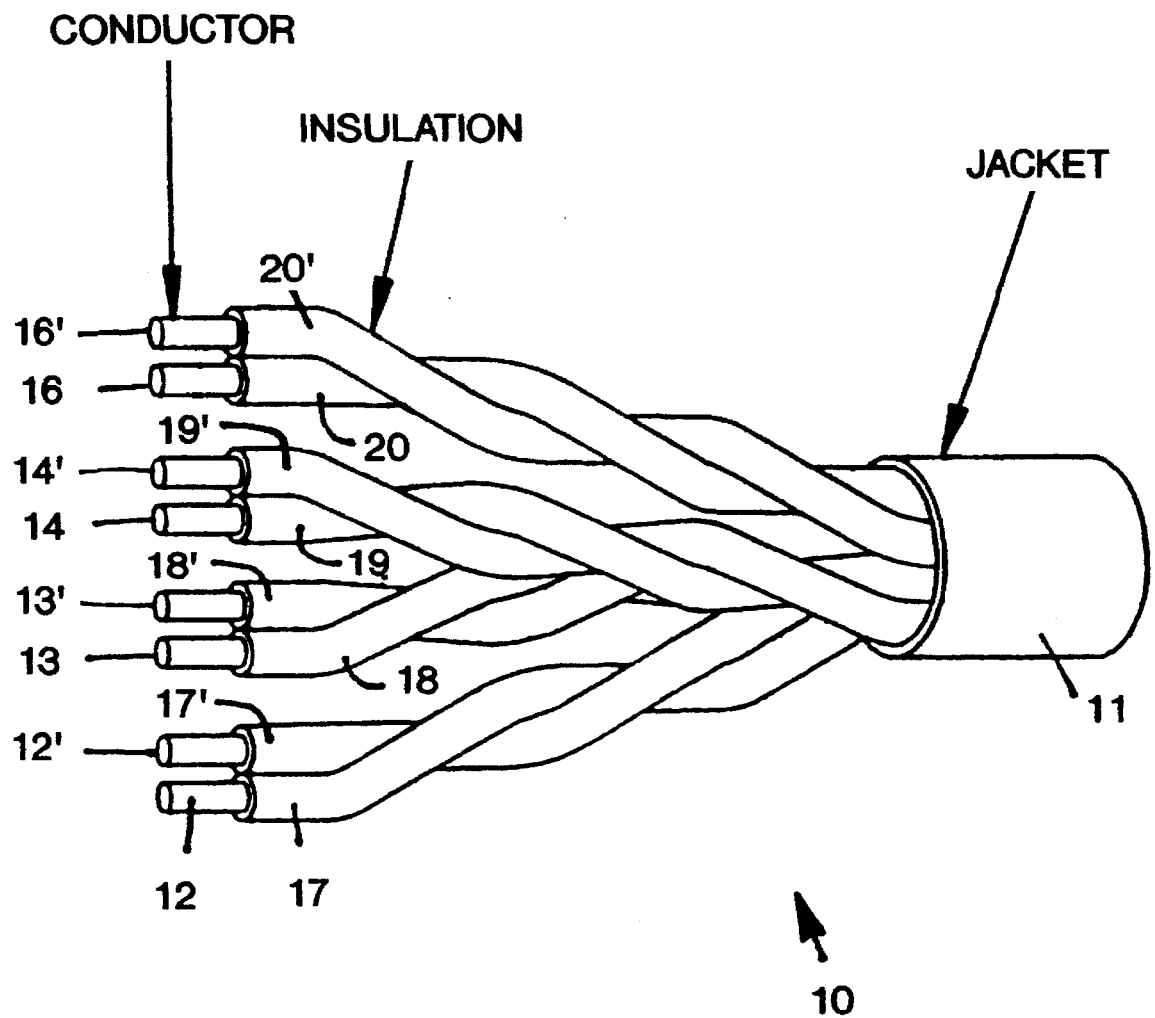

FLAME RETARDANT POLYOLEFIN WIRE INSULATIONS

FIELD OF THE INVENTION

This invention relates to insulated cables and to the insulation used thereon. More particularly, this invention relates to conductors insulated with the flame retardant polyolefin and to easily extrudable flame retardant polyolefin compositions for conductor insulation. The cables are particularly suitable for use in high performance plenum cables meeting EIA/TIA category-5-type requirements.

BACKGROUND OF THE INVENTION

Plenum cables are generally used in buildings where fire codes require flame retardant cables. Typically plenum data cables have two or more pairs of insulated conductors in a common jacket. The insulation can be made of several types of flame retardant insulation. A typical and widely used flame retardant insulation for conductors in data plenum cables is fluorinated ethylene-propylene (FEP Teflon®). FEP Teflon® insulation is presently in short supply and is somewhat difficult to extrude. Thus, special extrusion equipment is needed to extrude FEP Teflon®.

The present invention is directed to providing an insulation composition for conductors which can displace the fluorinated ethylene-propylene on one or more plenum data cable insulated conductors and reduce the need for fluorinated ethylene-propylene insulation.

SUMMARY OF THE INVENTION

The present invention provides a polyolefin base resin that is preferably a single or blended polyolefin base which not only provides smooth extrusion and low head pressure but also provides the level of flame retardant needed for insulated conductors in a plenum cable. A typical polyolefin composition of the present invention will contain a polyolefin blend of a polypropylene resin, a high and/or low density polyethylene and a very low density resin.

Accordingly, it is an object of the present invention to provide a conductor having a flame retardant polyolefin insulation thereon.

It is another object of the present invention to provide a plenum cable having a plurality of twisted pair insulated conductors wherein at least one pair of insulated conductors has for each insulated conductor of the one pair, a flame retardant polypropylene insulation that also contains very low density polyethylene, at least one of high density polyethylene and low density polyethylene and a halogen and a non-halogen flame retardant.

Accordingly, it is an object of the present invention to provide a flame retardant polyolefin composition for wire insulation that has high electrical performance consistent with category-5 type products and which is easily extrudable.

It is a further object of the present invention to provide a flame retardant polypropylene composition for wire insulation used in plenum cables and which contains very low density polyethylene and at least one of high density polyethylene and low density polyethylene, and both a halogen and a non-halogen flame retardant.

Other objects of the present invention will become apparent from the following drawing and detailed description of the invention and the accompanying claims.

BRIEF DESCRIPTION OF THE DRAWING

The figure shows a partial perspective view of a cable of the present invention.

DETAILED DESCRIPTION OF THE INVENTION

The drawing shows a plenum cable 10 having a jacket 11 and four pairs of twisted insulated conductors. Each insulator conductor has a conductor 12, 12', 13, 13', 14, 14', 15, 15' which may be any suitable data transmission conductor and a dielectric insulation 17, 17', 18, 18', 19, 19' and 20, 20', covering the respective conductor.

The jacket 11 is made from any acceptable jacket material used for plenum cables. One of the most widely used compositions is an extruded polyvinyl chloride.

The conductor insulation may be made from all of the same material or from different insulation materials. At least one of the insulated conductors has the polyolefin insulation composition of my invention as described herein. Preferably, each conductor of each pair has the same insulation. The insulation for the other plenum conductors which do not contain my polyolefin insulation is selected from any of the various known flame retardant foamed and non-foamed insulations suitable for plenum use, i.e., fluorinated ethylene-propylene (FEP), tetrafluoroethylene (FFE), ethylenechloro trifluoroethylene (ECTFE).

Although the Figure shows a plenum cable having four insulated twisted pair insulated conductors enclosed by a jacket, any number of twisted pairs may be used. Also, any known additional construction for the plenum cable, i.e., filler, shielding, etc., is considered as a part of this disclosure.

As stated above, at least one twisted pair 12, 12' has on each conductor 16 a polyolefin insulation 17, 17'. The insulation is a polyolefin blend of polypropylene resin, a very low density resin, and a high and/or low density polyethylene.

The polyolefin blend in my invention is preferably a mixture of polypropylene, very low density polyethylene and either one of or both of high density polyethylene and low density polyethylene.

The polypropylene resin provides structural strength and crush resistance to the flame retardant polyolefin composition. The amount of polypropylene present in the polyolefin composition used to form the insulation is from about 50 to about 85 parts by weight of polypropylene per hundred parts by weight of the polyolefin blend used. An example of a suitable polypropylene is PP7382 GE7 which is manufactured by Exxon and which has a density of 0.90 g/cc and melt flow rate of 4 g/10 min.

The very low density resin provides impact and low temperature performance. A preferred very low density resin is very low density polyethylene (VLDPE). VLDPE has a nominal density of below 0.910 g/cc and preferably in the range of 0.880 to 0.910 g/cc. The amount of very low density polyethylene present in the polyolefin composition is from about 10 to about 40 parts by weight VLDPE per hundred parts by weight of the polyolefin blend. An example of a very low density polyethylene is Exact 3022 made by Exxon and which has a melting point of 94° C., a density of 0.905 g/cc and a melt index (MI) of 9 g/10 min.

The polyolefin blend may also include a high and/or low density polyethylene in an amount of from about 5 to about 20 parts by weight per hundred parts by weight of the polyolefin blend. The low density polyethylene (LDPE) has a nominal density in the range of 0.910 to 0.925 g/cc. The high density polyethylene (HDPE) has a nominal density in the range of 0.941 to 0.965 g/cc. The high density polyethylene used as an example in my invention is Union Carbide's DGDL 3364 (previously DGDK 3364) which has a density at 23° C. of 0.945 g/cc, and an MI of 0.75 g/10 min.

The low density polyethylene used as an example in my invention is Union Carbide DFDA 6005 which has a density of 0.920 g/cc, an MI of 0.2 g/10 min., and a peak melting point of about 106° C.

The overall melt flow of the polyolefin blend is typically around 3.5 to 3.9 g/10 min under ASTM D1238 standards, i.e. at 230° C. and a force of 2.16 Kg. This provides milder extrusion pressure and smoother flow in the die.

The specific gravity of the polyolefin blend is about 0.918.

The polyolefin composition contains a flame retardant added to the polyolefin blend. The flame retardant is generally a mixture of halogen flame retardant chemicals, non-halogen flame retardant chemicals and a flame retardant intumescent composition. The flame retardant mixture generally contains from about 6 to about 20 parts by weight of halogen flame retardant per hundred parts by weight of the polyolefin blend and from about 20 to about 60 parts by weight of non-halogen flame retardant per hundred parts by weight of the polyolefin blend.

The preferred halogenated flame retardant is a chlorinated cyclooctene such as chlorinated dimethanodibenzo-cyclooctene. The specific compound is Dechlorane +35 which is dodecachloro-dodecahydro-dimethanodibenzo-cyclooctene. The chlorinated cyclooctene has a particle size of no greater than 12 microns. The halogenated flame retardant may also be selected from chlorinated wax, bromochloro wax, etc.

Dechlorane +35 is used in the polyolefin composition in an amount of from about 5 to about 15 parts by weight per hundred parts by weight of the polyolefin blend. Dechlorane +35 has a melting point of 350° C. and is made by Occidental.

The non-halogenated flame retardant may be selected from one or more of the following compounds zinc borate, aluminum trihydrate, magnesium hydroxide, zinc stannate, magnesium stearate, ammonium octamolybdate and zinc stearate.

The preferred non-halogen flame retardant is a mixture of a first non-halogen flame retardant, a second non-halogen flame retardant and a flame retardant intumescent.

The first non-halogen flame retardant is selected from one or more of zinc borate, zinc stearate, magnesium stearate, ammonium octamolybdate and zinc stannate. The preferred first non-halogen flame retardant is zinc borate. Zinc borate in the polyolefin composition is used in an amount of from about 12 to about 36 parts per by weight of zinc borate per hundred parts by weight of the polyolefin blend and is preferably about 24 parts by weight per hundred parts by weight of the polyolefin blend. In the preferred embodiment, ZB-467 Lite by Anzon (formerly Climax) is used. This is a non-hygroscopic free-flowing powder having an average particle size of 1.5 microns, a water solubility of 0.1 g/100 ml, a specific gravity of 2.74 and a refractive index of 1.59. Anzon has indicated that the formula is $4.ZnO.6.B_2O_3.7H_2O$.

The second non-halogen flame retardant is selected from one or more of magnesium hydroxide and magnesium stearate. The preferred second non-halogen flame retardant is FR-20 MHRM 105 which is magnesium hydroxide coated with 2% stearic acid.

The stearic acid coated magnesium hydroxide was obtained from Ameribrom under the tradename FR-20 MHRM-120. This is used in an amount of 8 to 24 parts by weight per hundred parts by weight of the polyolefin blend.

The flame retardant intumescent is a silicone powder. The preferred silicone powder used is Dow Corning's 4-7081 resin modifier which has been described as a silicone powder which has both vinyl and acrylate functionality. This is used in an amount of from about 4 to about 12 parts by weight per hundred parts by weight of the polyolefin blend.

The stabilizer in the polyolefin composition provides protection from degradation. A typical composition contains one or more hindered phenolic stabilizers and may have a secondary stabilizer. The hindered phenolic stabilizers are used in an amount of from 0.2 to 1.0 parts by weight per hundred parts by weight of the polyolefin blend. The primary hindered phenolic stabilizer in the polyolefin composition is used in an amount of from about 0.15 to about 0.5 parts by weight per hundred parts by weight of the polyolefin blend and is preferably about 0.15 parts by weight. An example of a primary stabilizer is Irganox 1010 made by Ciba Geigy. Ciba Geigy has indicated that this is tetrakis [methylene (3,5-di-tert-butyl-4 hydroxyhydrocinnamate)] methane. Likewise, the secondary hindered phenolic stabilizer is present in the polyolefin composition in an amount of from about 0.1 to about 0.5 parts by weight per hundred parts by weight of the polyolefin blend and is preferably about 0.25 parts by weight per hundred parts by weight of the polyolefin blend. An example of a secondary hindered phenolic stabilizer is Irganox MD 1024 by Ciba Geigy which has been described as having the formula 1,2-bis (3,5-di-tert-butyl-4 hydroxyhydrocinnamate) hydrazine.

Additional stabilizers are calcium stearate and Chemisorb 944 each used in an amount of about 0.05 to about 0.2 parts by weight per hundred parts by weight of the polyolefin blend and preferably about 0.10 parts by weight. The calcium stearate was purchased from Witco Chemical Company; Chicago, Ill. The Chemisorb 944, which is a polypropylene stabilizer, was purchased from Ciba Geigy.

The following Example illustrates the current insulation formulation of the inventive composition.

EXAMPLE

| Material | Mfg | Type | Parts by Weight | Ranges |
| --- | --- | --- | --- | --- |
| PP7382 | Exxon | PP | 70 | 50 to 85 |
| Exact 3022 | Exxon | VLDPE | 20 | 10 to 40 |
| DGDL 3364 | Union Carbide | HDPE | 10 | 5 to 20 |
| Dechlorane + 35 | Ooccidental | Chlorinated | 12 | 6 to 20 |
| 4-7081 | Dow Corning | FR Intumescent | 7.8 | 4 to 12 |

EXAMPLE -continued

| Material | Mfg | Type | Parts by Weight | Ranges |
|---|---|---|---|---|
| ZB-67 lite | Climax | FR Non-Halogen | 24 | 12 to 36 |
| FR-20 MHRM 105 | Ameribrom | FR Non-Halogen | 12 | 8 to 24 |
| Irganox 1010 | Ciba Geigy | Hindered Phenolic | 0.15 | .1 to .5 |
| Irganox MD 1024 | Ciba Geigy | Stabilizer | 0.25 | .1 to .5 |
| Calcium Stearate | Witco | Stabilizer | 0.10 | .05 to .2 |
| Chemisorb 944 | Ciba Geigy | Stabilizer | 0.10 | .05 to .2 |

The compounding of the above materials is preferably processed at a temperature of 160° C. to 170° C. Likewise, the above materials are preferably extruded at temperatures between 175° C. to 210° C. onto conductors 16 to prepare the insulated conductors 12, 12'. The plenum cable and twisted pairs are prepared by known procedures.

The foregoing is for purposes of illustration rather than limitation of the scope of protection accorded this invention. The latter is to be measured by the following claims, which should be interpreted as broadly as the invention permits.

The invention claimed is:

1. A plenum cable comprising a jacket covering a plurality of insulated conductors wherein at least one of the conductors has a flame retardant insulation composition having:
   a poyolefin blend comprising a mixture of polypropylene, a very low density polyethylene and a polyethylene, said polyethylene selected from the group consisting of high density polyethylene, low density polyethylene and a mixture thereof;
   a mixture of flame retarding chemicals comprising a mixture of a chlorinated flame retardant and a non-halogen flame retardant; and
   a hindered phenolic stabilizer.

2. The plenum cable of claim 1 wherein said chlorinated flame retardant is chlorinated cyclooctene.

3. The plenum cable of claim 1 wherein said plurality of insulated conductors comprises a plurality of twisted-pairs.

4. The plenum cable of claim 3 wherein both insulated conductors of said at least one twisted-pair has said flame retardant insulation composition.

5. The plenum cable of claim 1 wherein said non-halogen flame retardant is a mixture of a first non-halogen flame retardant, a second non-halogen flame retardant and a flame retardant intumescent.

6. The plenum cable of claim 5 wherein said first non-halogen flame retardant is zinc borate and said second non halogen flame retardant is magnesium hydroxide.

7. The plenum cable of claim 6 wherein the hindered phenolic stabilizer is a hindered phenolic stabilizer mixture of a primary and secondary hindered phenolic stabilizer with said primary hindered phenolic stabilizer being in an amount from about 0.15 to 0.5 parts by weight per hundred parts by weight of the polyolefin blend, and said secondary hindered phenolic stabilizer being in an amount from about 0.1 to about 0.5 parts by weight per hundred parts by weight of the polyolefin blend.

8. The plenum cable of claim 7 wherein said magnesium hydroxide is stearic acid coated magnesium hydroxide and wherein said hindered phenolic stabilizer mixture includes calcium stearate and polypropylene, and wherein the flame retardant intumescent is a silicone powder modifier which has both vinyl and acrylate functionality.

9. The plenum cable of claim 5 wherein said insulation composition comprises:
   from about 50 to about 85 parts by weight of polypropylene per hundred parts by weight of the polyolefin blend;
   from about 10 to about 40 parts by weight of very low density polyethylene per hundred parts by weight of the polyolefin blend;
   from about 5 to about 20 parts by weight of said polyethylene per hundred parts by weight of the polyolefin blend;
   from about 6 to about 20 parts by weight of chlorinated cyclooctene per hundred parts by weight of the polyolefin blend;
   from about 4 to about 12 parts by weight of a silicone modifier which has both vinyl and acrylate functionality per hundred parts by weight of the polyolefin blend;
   from about 12 to 36 parts by weight of zinc borate per hundred parts by weight of the polyolefin blend;.
   from about 8 to about 24 parts by weight of magnesium hydroxide per hundred parts by weight of the polyolefin blend;
   from about 0.2 to about 1.0 parts by weight of hindered phenolic stabilizer per hundred parts by weight of the polyolefin blend.

10. The plenum cable of claim 9 wherein said insulation composition has about 70 parts by weight of polypropylene; about 10 parts by weight of high density polyethylene; about 20 parts by weight of very low density polyethylene; and about 12 parts of chlorinated cyclooctene.

* * * * *

UNITED STATES PATENT AND TRADEMARK OFFICE
CERTIFICATE OF CORRECTION

PATENT NO. : 5,525,757
DATED : June 11, 1996
INVENTOR(S) : Douglas D. O'Brien

It is certified that error appears in the above-indentified patent and that said Letters Patent is hereby corrected as shown below:

Column 2, Line 27, delete "FFE" and insert --TFE--.

Signed and Sealed this

Seventeenth Day of September, 1996

Attest:

BRUCE LEHMAN

*Attesting Officer*  *Commissioner of Patents and Trademarks*